(12) United States Patent
Freeman-Powell et al.

(10) Patent No.: US 11,833,968 B2
(45) Date of Patent: Dec. 5, 2023

(54) IMAGING SYSTEM AND METHOD

(71) Applicant: JAGUAR LAND ROVER LIMITED, Warwickshire (GB)

(72) Inventors: Aaron Freeman-Powell, Coventry (GB); Alexander Pryke, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 5 days.

(21) Appl. No.: 17/435,132

(22) PCT Filed: Feb. 6, 2020

(86) PCT No.: PCT/EP2020/052927
§ 371 (c)(1),
(2) Date: Aug. 31, 2021

(87) PCT Pub. No.: WO2020/177970
PCT Pub. Date: Sep. 10, 2020

(65) Prior Publication Data
US 2022/0118910 A1  Apr. 21, 2022

(30) Foreign Application Priority Data

Mar. 2, 2019  (GB) .................................... 1902845

(51) Int. Cl.
*B60R 1/00* (2022.01)
*G01P 3/38* (2006.01)
(Continued)

(52) U.S. Cl.
CPC ................ *B60R 1/003* (2013.01); *G01P 3/38* (2013.01); *G06T 11/60* (2013.01); *H04N 23/698* (2023.01);
(Continued)

(58) Field of Classification Search
CPC .............. B60R 1/003; B60R 2300/303; B60R 2300/306; B60R 2300/8066;
(Continued)

(56) References Cited

U.S. PATENT DOCUMENTS 10,701,299 B2 * 6/2020 Greenwood ............ G06T 11/00
10,701,300 B2 * 6/2020 Greenwood ....... H04N 5/23238
(Continued)

FOREIGN PATENT DOCUMENTS

CN   104735403 A   6/2015
CN   106218506 A   12/2016
(Continued)

OTHER PUBLICATIONS

First office action for CN Application No. 202080018175.9 dated Oct. 9, 2022.
Combined Search and Examination Report under Sections 17 and 18(3) for Application No. GB1902845.5 dated Aug. 15, 2019.
(Continued)

*Primary Examiner* — Farzana Hossain
(74) *Attorney, Agent, or Firm* — Carlson, Gaskey & Olds, P.C.

(57) ABSTRACT

Aspects of the present invention relate to an imaging system (1) for a towing vehicle (V1). The imaging system (1) includes a processor configured to determine a reference speed (Vref) of the towing vehicle (V1). First image data (D1) is received from a first imaging device (C1); and second image data (D2) is received from a second imaging device (C2). The first imaging device (C1) may be disposed on the towing vehicle (V1); and the second imaging device (C2) may be disposed on a towed vehicle (V2). A first scaling factor (SF1, SF2) is applied to the second image data (D2) to generate scaled second image data (D2). The first scaling factor (SF1, SF2) is determined in dependence on the determined reference speed (Vref) of the towing vehicle (V1). Composite image data (D3) is generated by combining
(Continued)

at least a part of the scaled second image data (D2) with at least a part of the first image data (D1). The composite image data (D3) is output for display on a display screen (10). Aspects of the present invention also relate a vehicle (V1) having an image system (1); a method of generating a composite image (IMG3); and a non-transitory computer-readable medium.

16 Claims, 9 Drawing Sheets

(51) Int. Cl.
    *G06T 11/60*     (2006.01)
    *H04N 23/698*     (2023.01)

(52) U.S. Cl.
    CPC ... *B60R 2300/303* (2013.01); *B60R 2300/306* (2013.01); *B60R 2300/8066* (2013.01); *G06T 2207/30252* (2013.01)

(58) Field of Classification Search
    CPC ..... B60R 2300/802; B60R 1/00; B60R 1/002; G01P 3/38; G06T 11/60; G06T 2207/30252; G06T 5/005; G06T 5/50; H04N 5/23238; H04N 5/247; H04N 7/181; H04N 5/265; H04N 7/18; H04N 23/698; H04N 23/90
    See application file for complete search history.

(56) References Cited

U.S. PATENT DOCUMENTS

| | | | |
|---|---|---|---|
| 11,027,667 B2* | 6/2021 | Greenwood | B60R 1/00 |
| 2002/0167589 A1 | 11/2002 | Schofield et al. | |
| 2017/0006234 A1* | 1/2017 | Higuchi | H04N 7/188 |
| 2017/0341583 A1 | 11/2017 | Zhang et al. | |
| 2018/0154831 A1 | 6/2018 | Spencer et al. | |
| 2020/0286244 A1* | 9/2020 | Freeman-Powell | G06T 11/60 |
| 2021/0094577 A1* | 4/2021 | Shalev-Shwartz | B60W 30/0953 |

FOREIGN PATENT DOCUMENTS

| | | |
|---|---|---|
| CN | 106573577 A | 4/2017 |
| CN | 107433905 A | 12/2017 |
| CN | 107848465 A | 3/2018 |
| EP | 3028898 A1 | 6/2016 |
| GB | 2529408 A | 2/2016 |
| GB | 2563647 A | 12/2018 |
| JP | 2013255237 A | 12/2013 |
| WO | 2016/026870 A1 | 2/2016 |
| WO | 2016/185691 A1 | 11/2016 |
| WO | 2018/029005 A1 | 2/2018 |
| WO | 2018149665 A1 | 8/2018 |

OTHER PUBLICATIONS

International Search Report and Written Opinion of the International Searching Authority for International application No. PCT/EP2020/052927 dated Apr. 17, 2020.

* cited by examiner

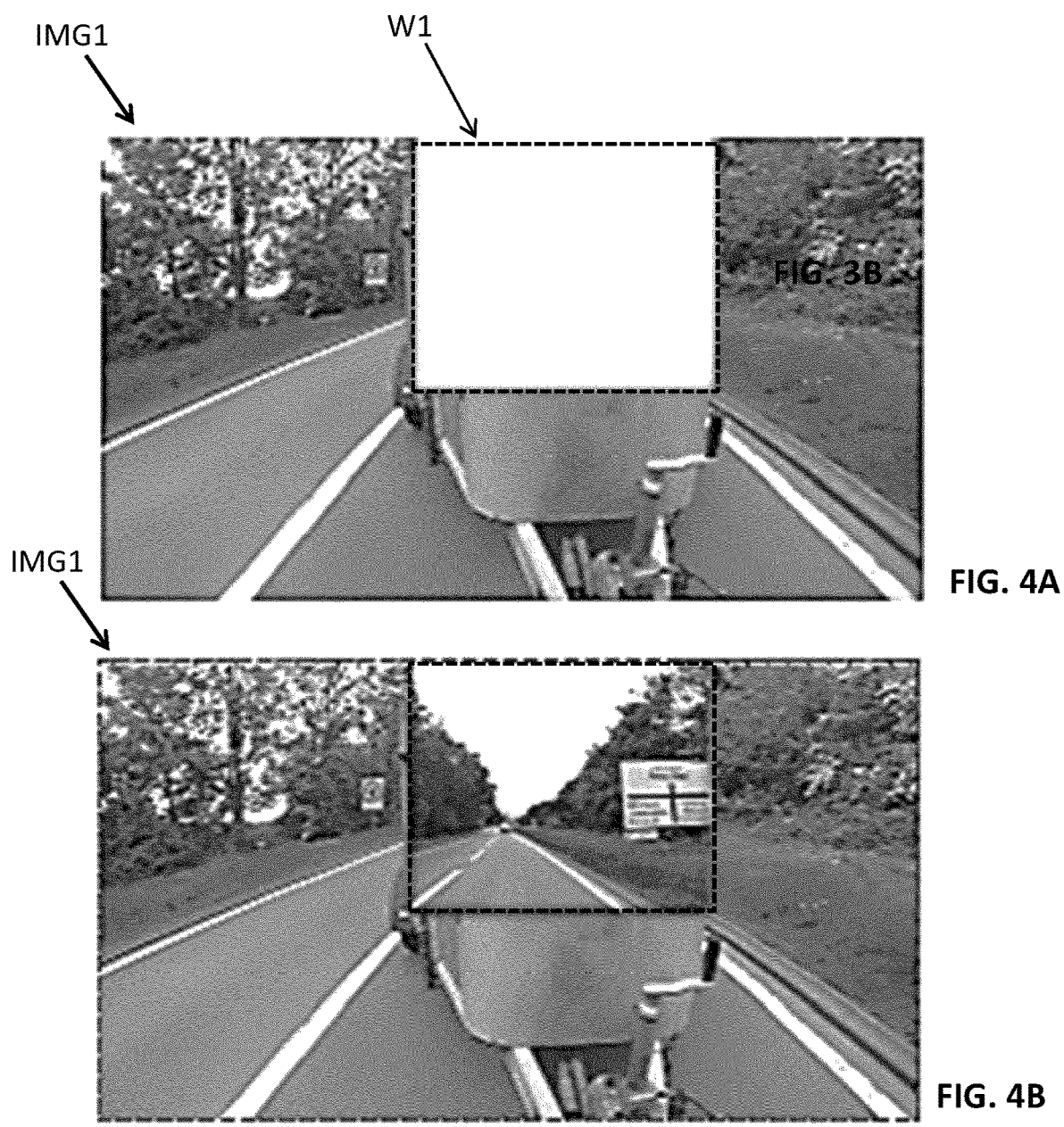

Scale angle θ by 1/ (y/(x+y))

IMAGING SYSTEM AND METHOD

TECHNICAL FIELD

The present disclosure relates to an imaging system and method. Aspects of the invention relate to an imaging system for generating a composite image; a vehicle comprising an image system; a method of generating a composite image; and a non-transitory computer-readable medium.

BACKGROUND

It is known from UK patent application number GB 1414632.8 to provide a system and apparatus for generating a composite image of a region behind a trailer coupled to a towing vehicle. The composite image is generated by combining a first image captured by a camera provided on the towing vehicle and a second image captured by a camera provided on the trailer. The resulting composite image may include a semi-transparent representation of the trailer to aid assessment of the relative position of other vehicles and objects. The first and second cameras are physically displaced from one another. The inventor(s) on the present application have recognised that one effect of the offset between the cameras is that the same object imaged by the first and second cameras may appear to have different sizes. This is more pronounced for objects located proximal to the camera than for objects that are distal from the camera due to perspective imaging. The issue is also present when combining an image from a camera into a virtual camera viewport, when the physical camera is displaced from the origin of the virtual camera viewport.

It is an aim of the present invention to address one or more of the disadvantages associated with the prior art.

SUMMARY OF THE INVENTION

Aspects and embodiments of the invention provide an imaging system for generating a composite image; a vehicle comprising an image system; a method of generating a composite image; and a non-transitory computer-readable medium according to the appended claims According to an aspect of the present invention there is provided an imaging system for a vehicle, the imaging system having a processor configured to:
  receive first image data from a first imaging device;
  apply a first scaling factor to the first image data to generate scaled first image data, the first scaling factor being determined in dependence on a vehicle parameter; and
  output the scaled first image data for display on a display screen.

The processor may be configured to determine a reference speed of the towing vehicle. The first scaling factor may be determined in dependence on the determined reference speed.

The processor may be configured to receive second image data from a second imaging device. The processor may be configured to generate composite image data by combining the scaled first image data with the second image data. The scaled first image data may be output as part of the composite image data.

Alternatively, or in addition, the vehicle parameter may comprise a first imaging device offset distance measured between the first imaging device and the display screen. The first scaling factor may be inversely proportional to the first imaging device offset distance.

The first scaling factor may be determined in dependence on a sum of the first imaging device offset distance and a reference head offset distance. The reference head offset distance may be the distance between the display screen and a reference head position.

According to a further aspect of the present invention there is provided an imaging system for a towing vehicle, the imaging system having a processor configured to:
  determine a reference speed of the towing vehicle;
  receive first image data from a first imaging device;
  receive second image data from a second imaging device;
  apply a first scaling factor to the second image data to generate scaled second image data, the first scaling factor being determined in dependence on the determined reference speed of the towing vehicle;
  generate composite image data by combining at least a part of the scaled second image data with at least a part of the first image data; and
  output the composite image data for display on a display screen.

The inventor(s) of the present invention have determined that the aforementioned limitation(s) associated with the prior art could be addressed by scaling one or both of the images so that all objects appear to have the same relative size in the composite image. However, a constant scale factor for a complete image may not achieve this satisfactorily since objects can be at different distances in the scene. The degree of scaling applied to the image could be varied across the image. The image can be skewed/warped like a keystone, for example based on an assumption that objects in the lower portion of the scene are nearer to the imaging device, and objects in the upper portion are further away (for example, in the sky). However, this approach may lead to distortion of nearby objects, for example a following vehicle in a vehicle-based system. At least in certain embodiments, the present invention performs scaling so that objects in the composite image appear at the correct size to the user. Since the first scaling factor is determined in dependence on the reference speed, the field of view may vary as the reference speed changes. For example, in certain embodiments, the view from the second imaging device may appear to zoom out when the reference speed is low; this may show a broad field of view immediately behind the second imaging device. Conversely, the view from the second imaging device may appear to zoom in when the reference speed is high; this may show a narrow field of view immediately behind the second imaging device. The narrow field of view offers a restricted view directly behind the second imaging device.

The first imaging device may be disposed on the towing vehicle. The second imaging device may be disposed on a towed vehicle. The towed vehicle may be connected to the towing vehicle. An articulated joint or connector may be provided between the towing vehicle and the towed vehicle.

The processor may be configured to identify a front face and/or a frontal region of the towed vehicle within the first image data. The processor may, for example, analyse the first image data to identify a periphery or a boundary of the towed vehicle.

The processor may be configured to select a subsection of the second image data. The processor may be configured to apply the first scaling factor to the selected subsection of the second image data. The size and/or position of the selected subsection of the second image data may correspond to the size and/or position of the front face or the frontal region of the towed vehicle within the first image data.

Alternatively, the processor may be configured to select a subsection of the scaled second image data. The processor may generate the composite image data by combining the selected subsection of the scaled second image data and the first image data. The size and/or position of the selected subsection of the scaled second image data may correspond to the size and/or position of the front face or the frontal region of the towed vehicle within the first image data.

The processor may be configured to generate the composite image data by inserting the scaled second image data into a window formed in the first image data. Alternatively, or in addition, the processor may be configured to generate the composite image data by overlaying one of the scaled second image data and the first image data onto the other of the scaled second image data and the first image data.

The first imaging device may have a first angle of view and the second imaging device may have a second angle of view. The first scaling factor may be determined in dependence on a ratio of the first and second angles of view.

The first scaling factor may be inversely proportional to a first longitudinal distance between the first imaging device and the second imaging device. The first longitudinal distance may be user-specified or may be determined by analysing communication signals to and/or from the first imaging device and the second imaging device. A default value may be predefined for the first longitudinal distance.

The first scaling factor may be calculated according to the following formula:

$$\text{Scaling Factor} = \frac{y}{(x+y)}$$

Where
x is the first longitudinal distance between the first imaging device and the second imaging device; and
y is a reference distance between the first imaging device and a virtual object.

The reference distance (y) may be calculated according to the following formula:

$$y = t \cdot V\text{ref} + c$$

Where
t is a reference time period;
Vref is the reference speed of the towing vehicle; and
c is a constant.

The processor may be configured to apply a second scaling factor to at least one of the first image data and the second image data. The second scaling factor may be determined in dependence on a first imaging device offset distance measured between the first imaging device and the display screen.

The second scaling factor may be determined in dependence on a sum of the first imaging device offset distance and a reference head offset distance, the reference head offset distance being the distance between the display screen and a reference head position.

According to a further aspect of the present invention there is provided a vehicle comprising an imaging system as described herein.

According to a further aspect of the present invention there is provided a method of processing an image, the method comprising:
receiving a first image from a first imaging device;
applying a first scaling factor to the first image to generate a scaled first image, the first scaling factor being determined in dependence on a vehicle parameter; and
outputting the scaled first image data for display on a display screen.

According to a further aspect of the present invention there is provided a method of generating a composite image, the method comprising:
determining a reference speed of a host vehicle;
receiving a first image from a first imaging device;
receiving a second image from a second imaging device;
apply a first scaling factor to the second image to generate a scaled second image, the first scaling factor being determined in dependence on the determined reference speed of the host vehicle;
generating the composite image by combining at least a part of the scaled second image and at least a part of the first image data; and
outputting the composite image for display on a display screen.

The first imaging device may be disposed on the towing vehicle. The second imaging device may be disposed on a towed vehicle. The towed vehicle may be connected to the towing vehicle. An articulated joint or connector may be provided between the towing vehicle and the towed vehicle.

The method may comprise selecting a subsection of the second image and applying the first scaling factor to the selected subsection of the second image.

The method may comprise selecting a subsection of the scaled second image; and generating the composite image by combining the selected subsection of the scaled second image and the first image.

The method may comprise generating the composite image comprises inserting the scaled second image into a window in the first image.

The first imaging device may have a first angle of view and the second imaging device has a second angle of view. The first scaling factor may be determined in dependence on a ratio of the first and second angles of view.

The first scaling factor may be inversely proportional to a first longitudinal distance between the first imaging device and the second imaging device. The first longitudinal direction may be parallel to a direction of travel of the towing vehicle (which generally corresponds to a direction of travel of the towing vehicle).

The method may comprise calculating the first scaling factor using the following formula:

$$\text{Scaling Factor} = \frac{y}{(x+y)}$$

Where
x is the first longitudinal distance between the first imaging device and the second imaging device; and
y is a reference distance between the first imaging device and a virtual object.

The reference distance (y) may be calculated according to the following formula:

$$y = t \cdot V\text{ref} + c$$

Where
t is a reference time period;
Vref is the reference speed of the towing vehicle; and
c is a constant.

The method may comprise applying a second scaling factor to at least one of the first image and the second image. The second scaling factor may be determined in dependence on a first imaging device offset distance measured between the first imaging device and the display screen.

The second scaling factor may be determined in dependence on a sum of the first imaging device offset distance and a reference head offset distance. The reference head offset distance may be the distance between the display screen and a reference head position.

According to a further aspect of the present invention there is provided a non-transitory computer-readable medium having a set of instructions stored therein which, when executed, cause a processor to perform the method described herein.

According to a further aspect of the present invention there is provided an imaging system for a vehicle, the imaging system having a processor configured to:
  receive first image data from a first imaging device;
  apply a first scaling factor to the first image data to generate scaled first image data; and
  output the scaled first image data for display on a display screen;
  wherein the first scaling factor is determined in dependence on a first imaging device offset distance measured between the first imaging device and the display screen.

The first scaling factor may be inversely proportional to the first imaging device offset distance.

The first scaling factor may be determined in dependence on a sum of the first imaging device offset distance and a reference head offset distance. The reference head offset distance may be the distance between the display screen and a reference head position.

The first scaling factor may be inversely proportional to the sum of the first imaging device offset distance and the reference head offset distance.

The processor may be configured to determine a reference speed of the vehicle. The first scaling factor may be determined in dependence on the determined reference speed.

The first scaling factor may be calculated according to the following formula:

$$\text{Scaling Factor} = \frac{y}{(x+y)}$$

Where
  x is the first longitudinal distance between the first imaging device and the second imaging device; and
  y is a reference distance between the first imaging device and a virtual object.

The reference distance y may be calculated according to the following formula:

$$y = 2 \cdot V\text{ref} + c$$

Where
  Vref is the reference speed of the towing vehicle (V1); and
  c is a constant.

The processor may be configured to receive second image data from a second imaging device; and apply a second scaling factor to the second image data to generate scaled second image data. The second scaling factor may be determined in dependence on a second imaging device offset distance measured between the second imaging device and the display screen. The second imaging device offset distance may be measured along a longitudinal axis of the vehicle.

The second scaling factor may be inversely proportional to the second distance. The second scaling factor may be determined in dependence on a sum of the second imaging device offset distance and a reference head offset distance. The reference head offset distance may be the distance between the display screen and a reference head position.

The second scaling factor may be inversely proportional to the sum of the second imaging device offset distance and the reference head offset distance.

According to a further aspect of the present invention there is provided a vehicle comprising an imaging system as described herein.

According to a further aspect of the present invention there is provided a method of scaling a first image for display on a display screen, the method comprising:
  receive a first image from a first imaging device;
  apply a first scaling factor to the first image to generate a scaled first image; and
  output the scaled first image for display on the display screen;
  wherein the first scaling factor is determined in dependence on a first imaging device offset distance measured between the first imaging device and the display screen.

The first scaling factor may be inversely proportional to the first imaging device offset distance. The first scaling factor may be determined in dependence on a sum of the first imaging device offset distance and a reference head offset distance, the reference head offset distance being the distance between the display screen and a reference head position.

The first scaling factor may be inversely proportional to the sum of the first imaging device offset distance and the reference head offset distance.

The method may comprise determining a reference speed of a host vehicle. The first scaling factor may be determined in dependence on the determined reference speed.

The first scaling factor may be calculated according to the following formula:

$$\text{Scaling Factor} = \frac{y}{(x+y)}$$

Where
  x is the first longitudinal distance between the first imaging device and the second imaging device; and
  y is a reference distance between the first imaging device and a virtual object.

The reference distance y may be calculated according to the following formula:

$$y = 2 \cdot V\text{ref} + c$$

Where
  Vref is the reference speed of the towing vehicle (V1); and
  c is a constant.

The method may comprise receiving a second image; and applying a second scaling factor to the second image to generate scaled second image. The second scaling factor may be determined in dependence on a second imaging device offset distance measured between the second imaging device and the display screen.

The second imaging device offset distance may be a second longitudinal distance measured along a longitudinal axis of the vehicle.

The second scaling factor may be inversely proportional to the second imaging device offset distance.

The second scaling factor may be determined in dependence on a sum of the second imaging device offset distance and a reference head offset distance. The reference head offset distance may be the distance between the display screen and a reference head position.

The second scaling factor may be inversely proportional to the sum of the second imaging device offset distance and the reference head offset distance.

According to a further aspect of the present invention there is provided a non-transitory computer-readable medium having a set of instructions stored therein which, when executed, cause a processor to perform the method described herein.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIG. 4A shows a window formed in the towing vehicle image within a region corresponding to the towed vehicle;

FIG. 4B shows a composite image created by inserting a section of the towed vehicle image into the window created in the towing vehicle image;

DETAILED DESCRIPTION

Figure 1:
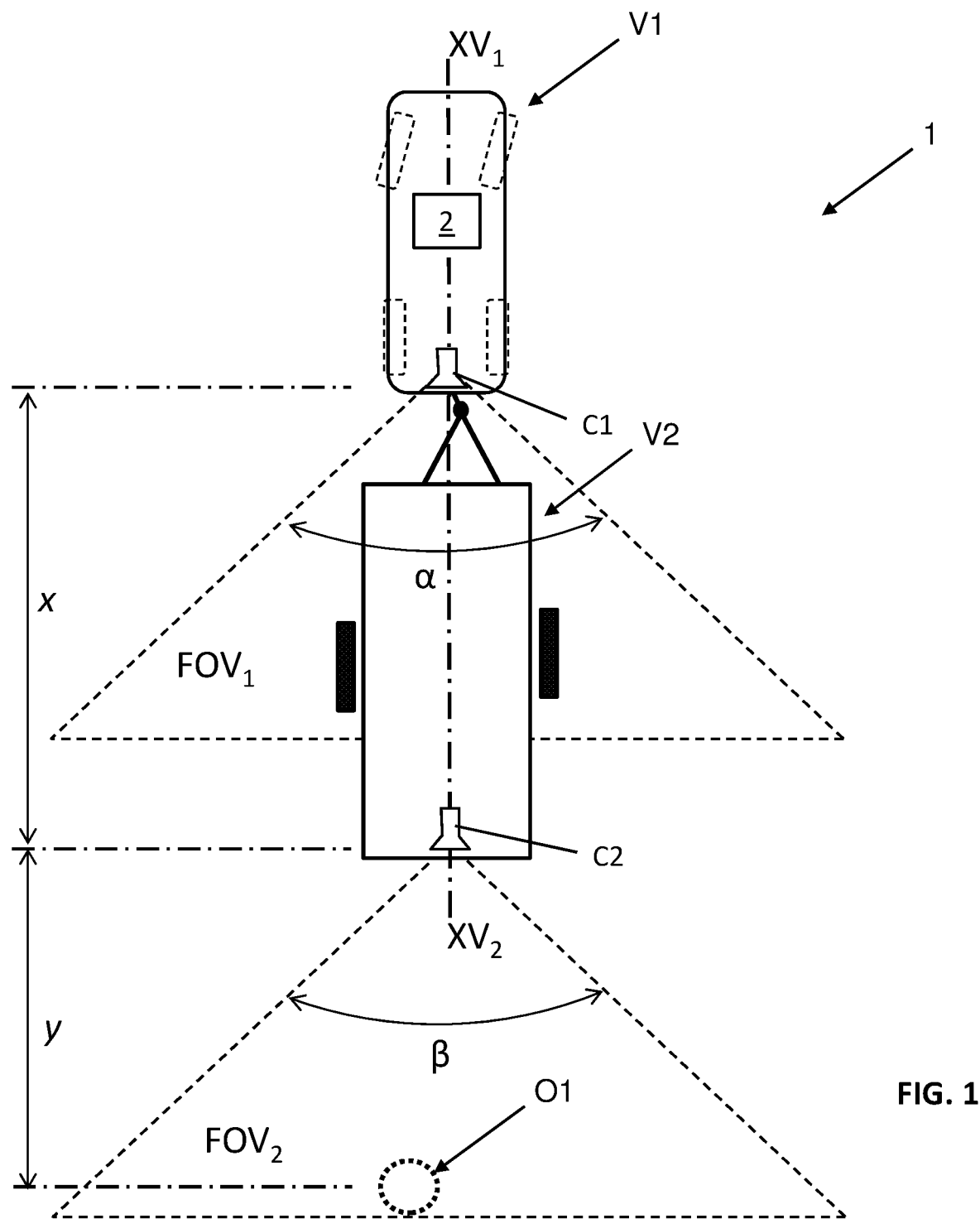
FIG. 1 shows a schematic representation of an imaging system according to an embodiment of the present invention provided in a towing vehicle and a towed vehicle.

An imaging system 1 in accordance with an embodiment of the present invention will now be described with reference to the accompanying figures. The imaging system 1 is disposed in a first vehicle V1. In the present embodiment, the first vehicle V1 is connected to a second vehicle V2. The first vehicle V1 is a towing vehicle V1, such as an automobile, a utility vehicle, or a tractor. The second vehicle V2 is a towed vehicle V2, such as a trailer. The towing vehicle V1 and the towed vehicle V2 are illustrated in FIG. 1. The towing vehicle V1 has a first longitudinal axis XV1, and the towed vehicle V2 has a second longitudinal axis XV2.

As shown in FIG. 1, the imaging system 1 comprises at least one controller 2, a towing vehicle imaging device C1 and a towed vehicle imaging device C2. In the present embodiment the towing vehicle imaging device C1 is in the form of a towing vehicle camera C1; and the towed vehicle imaging device C2 is in the form of a towed vehicle camera C2. The towing vehicle camera C1 and the towed vehicle camera C2 are offset from each other by a first longitudinal distance x. The towing vehicle camera C1 is disposed at the rear of the towing vehicle V1 and is oriented in a rear-facing direction. The towing vehicle camera C1 has an optical axis substantially parallel to the first longitudinal axis XV1. The towing vehicle camera C1 has a first field of view FOV1 which encompasses a region to the rear of the towing vehicle V1. The towing vehicle camera C1 has a first angle of view α. In use, the towing vehicle camera C1 captures first image data D1 corresponding to a towing vehicle image IMG1. The towing vehicle image IMG1 comprises a rear-facing scene from the towing vehicle V1 captured by the towing vehicle camera C1. The towing vehicle image IMG1 may, for example, include at least a portion of a front of the towed vehicle V2 as well as some of the environment around the towed vehicle V2, for example to the sides and/or above and/or below the towed vehicle V2. The towed vehicle camera C2 is disposed at the rear of the towed vehicle V2 and is oriented in a rear-facing direction. The towed vehicle camera C2 has an optical axis substantially parallel to the second longitudinal axis XV2. The towed vehicle camera C2 has a second field of view FOV2 which encompasses a region to the rear of the towed vehicle V2. The towed vehicle camera C2 has a second angle of view β. In use, the towed vehicle camera C2 captures second image data D2 corresponding to a towed vehicle image IMG2. The towed vehicle image IMG2 comprises a rear-facing scene from the towed vehicle V2 captured by the towed vehicle camera C2. The towed vehicle image IMG2 may, for example, include an image of the road behind the towed vehicle V2 and other vehicles behind the towed vehicle V2. The horizontal and/or vertical extent of the towing vehicle image IMG1 and/or the towed vehicle image IMG2 depend on the viewing angle of the towing vehicle camera C1 and the towed vehicle camera C2. The first and second angles of view α, β may be the same as each other or may be different from each other. In the present embodiment, the towing vehicle camera C1 and the towed vehicle camera C2 each comprise a wide-angle lens having an angle of view α, β of approximately 180°. The angle of view of the towed vehicle camera C1 and the towing vehicle camera C2 could be narrower. The towing vehicle camera C1 and the towed vehicle camera C2 are both digital cameras. The towing vehicle camera C1 is operable to generate first image data D1 representing the towing vehicle image IMG1; and the towed vehicle camera C2 is operable to generate second image data D2 representing the towed vehicle image IMG2. The towed vehicle camera C1 is operable to capture a plurality of first image frames per second. The towing vehicle camera C2 is operable to capture a plurality of second image frames per second.

Figure 2:
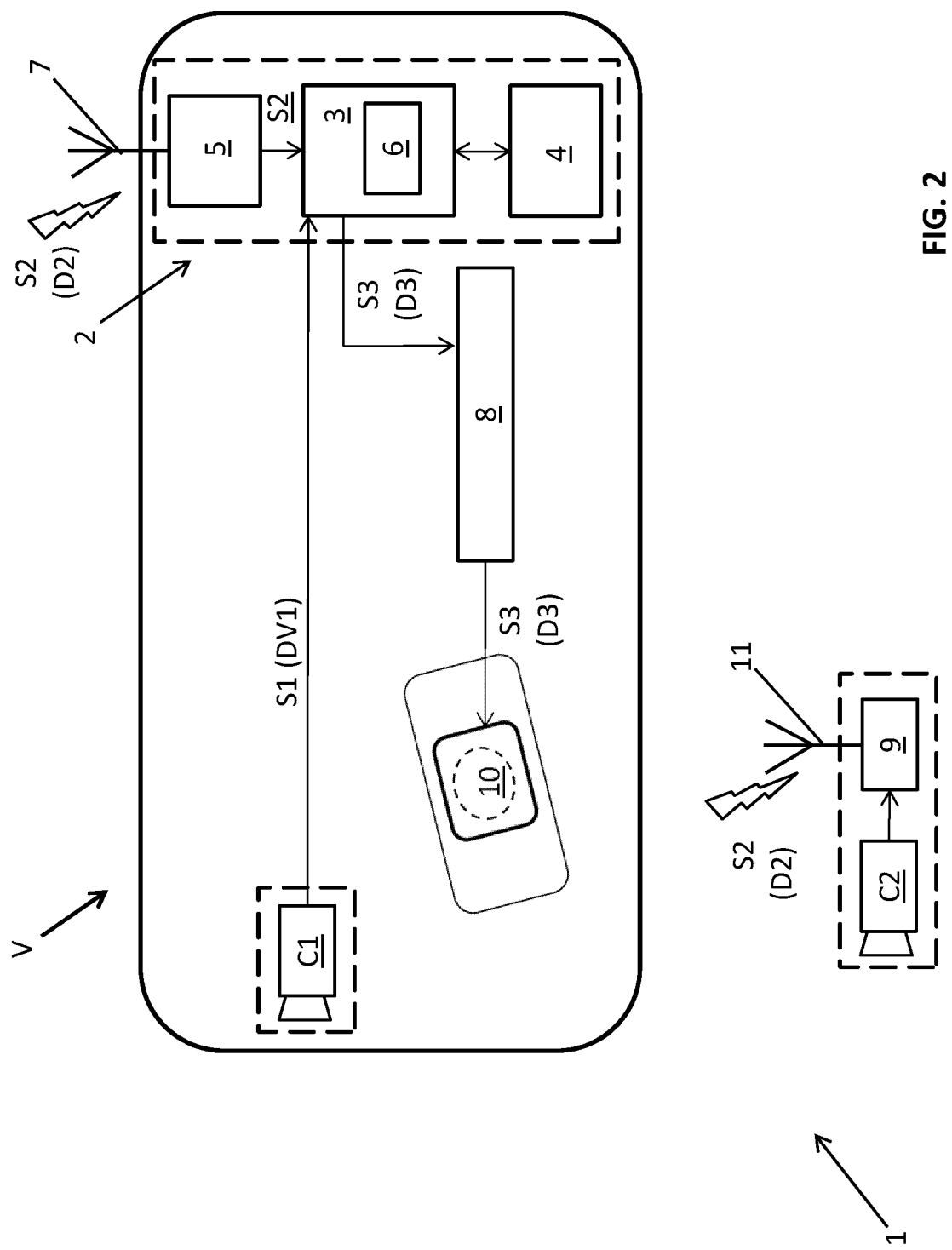
FIG. 2 shows a schematic representation of the imaging system shown in FIG. 1.

In the present embodiment, the or each controller 2 is disposed in the towing vehicle V1. As shown in FIG. 2, the controller 2 comprises at least one electronic processor 3. The at least one electronic processor 3 has one or more electrical input(s) for receiving one or more input signals from the towing vehicle camera C1 and the towed vehicle camera C2; and one or more electrical output(s) for outputting an output signal. The or each controller 2 further comprises at least one memory device 4 electrically coupled to the at least one electronic processor 3 and having instructions stored therein. The at least one electronic processor 3 is configured to access the at least one memory device 4 and execute the instructions thereon so as to perform the method (s) described herein. The or each controller 2 is connected to a wireless receiver 5 in the present embodiment. The processor 3 is configured to execute a set of software instructions held in the electronic memory device 4 and implements an image processing module (denoted by the reference numeral 6).

The, or each, electronic processor 3 may comprise any suitable electronic processor (e.g., a microprocessor, a microcontroller, an ASIC, etc.) that is configured to execute electronic instructions. The, or each, electronic memory device 4 may comprise any suitable memory device and may store a variety of data, information, threshold value(s), lookup tables or other data structures, and/or instructions therein or thereon. In an embodiment, the memory device 18 has information and instructions for software, firmware, programs, algorithms, scripts, applications, etc. stored therein or thereon that may govern all or part of the methodology described herein. The processor, or each, electronic processor 3 may access the memory device 18 and execute and/or use that or those instructions and information to carry out or perform some or all of the functionality and methodology describe herein.

The at least one memory device 4 may comprise a computer-readable storage medium (e.g. a non-transitory or non-transient storage medium) that may comprise any mechanism for storing information in a form readable by a machine or electronic processors/computational devices, including, without limitation: a magnetic storage medium (e.g. floppy diskette); optical storage medium (e.g. CD-ROM); magneto optical storage medium; read only memory (ROM); random access memory (RAM); erasable programmable memory (e.g. EPROM ad EEPROM); flash memory; or electrical or other types of medium for storing such information/instructions.

The processor 3 is connected to a communication bus 8, such as the towing vehicle CAN bus, for communicating with other towing vehicle systems. The wireless receiver 5 comprises a first antenna 7. The towed vehicle camera C2 is connected to a wireless transmitter 9 having a second antenna 11. In use, the wireless transmitter 9 transmits the second image data D2 captured by the towed vehicle camera C2 to the wireless receiver 5. The processor 3 is configured to receive the first image data D1 generated by the towing vehicle camera C1 and the second image data D2 generated by the towed vehicle camera C2. The towing vehicle V1 comprises a display screen 10 on which the towing vehicle image IMG1 and the towed vehicle image IMG2 received from the towing vehicle camera C1 and the towed vehicle camera C2 respectively can be selectively displayed.

The towing vehicle camera C1 is mounted centrally at the rear of the towing vehicle V1 above a rear license plate (not shown) and, in the present embodiment, can selectively function as a reversing camera to provide a parking aid when there is no towed vehicle V2 coupled to the towing vehicle V1. Other mounting locations for the towing vehicle camera C1 are contemplated. The towed vehicle camera C2 is mounted centrally at the rear of the towed vehicle V2. Other mounting locations for the towed vehicle camera C2 are contemplated. The towing vehicle camera C1 and the towed vehicle camera C2 are arranged at approximately the same vertical height above ground level. In alternate arrangements, the towing vehicle camera C1 and the towed vehicle camera C2 can be offset from each other in a vertical direction and/or a transverse direction. The image processing module 6 can be configured to correct for any such positional offset. Equally, the image processing module 6 can be configured to correct for an angular offset between the towing vehicle camera C1 and the towed vehicle camera C2, for example if one or both of the towing vehicle camera C1 and the towed vehicle camera C2 are angularly offset from the respective first and second longitudinal axes XV1, XV2.

Figure 3A:
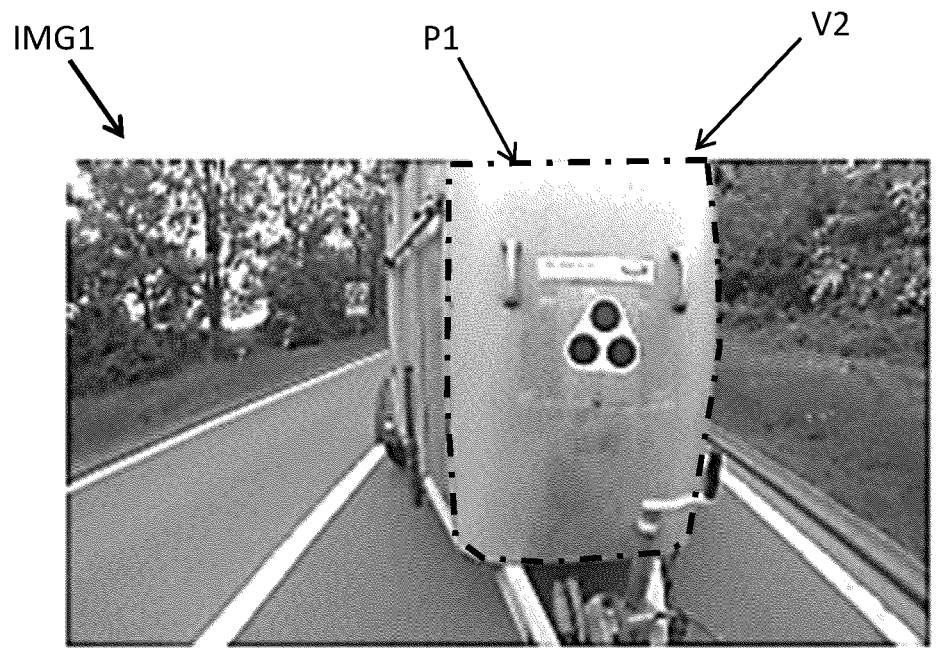
FIG. 3A shows a towing vehicle image captured by a camera disposed in the towing vehicle.
Figure 3B:
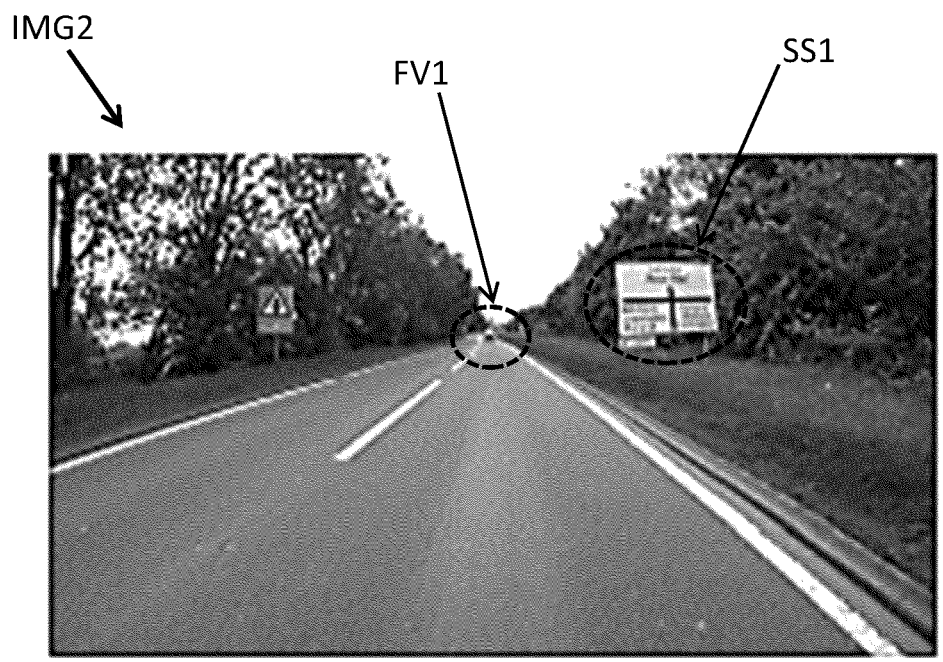
FIG. 3B shows a towed vehicle image captured by a camera disposed in the towed vehicle.

The towing vehicle camera C1 outputs a first signal S1 comprising said first image data D1 corresponding to the towing vehicle image IMG1. The first signal S1 is published to the communication bus 8 and provides a first input for the image processing module 6. The towed vehicle camera C2 outputs said second image data D2 corresponding to the towed vehicle image IMG2. The second signal S2 is transmitted by the wireless transmitter 9 to the wireless receiver 5 to provide a second input for the image processing module 6. The wireless transmitter 9 can transmit the second signal S2 using a suitable wireless communication standard, such as Wi-Fi®. In a variant, the second signal S2 could be transmitted over a wired connection between the towed vehicle V2 and the towing vehicle V1. By way of example, a first image IMG1 is shown in FIG. 3A; and a second image IMG2 is shown in FIG. 3B. The first and second images IMG1, IMG2 shown in FIGS. 3A and 3B were captured simultaneously by the first and second cameras C1, C2 respectively. A street sign SS1 and a following vehicle FV1 are visible in the second image IMG2 captured by the second camera C2 disposed on the towed vehicle V2. However, both the street sign SS1 and the following vehicle FV1 are obscured from view in the first image IMG1 by the presence of the towed vehicle V2. The street sign SS1 and the following vehicle FV1 are highlighted in FIG. 3B by first and second ellipses comprising broken lines. It will be appreciated that the ellipses have been added for the purpose of aiding understanding and do not form part of the second image IMG2.

The image processing module 6 is configured to combine at least a portion of the first image data D1 with at least a portion of the second image data D2 to generate composite image data IMG3. The image processing module 6 is configured to analyse the towing vehicle image IMG1 to identify a periphery P1 of the towed vehicle V2. As shown in FIG. 3A, the periphery P1 represents the external visible boundary (or edge) of the towed vehicle V2 from the view point of the towing vehicle camera C1. The image processing module 6 can identify the periphery P1 by calculating optical flow vectors of pixels between two or more frames of the towing vehicle image IMG1. A gradient of the magnitude of the optical flow vectors is calculated across the towing vehicle image IMG1. The gradient is largest at the periphery P1 of the trailer T where pixels associated with a region of the towing vehicle image IMG1 relating to the trailer T (and having a relatively low movement) are disposed proximal to or adjacent to pixels associated with a region of the towing vehicle image IMG1 relating to the background (and having a relatively high movement). Other techniques can be used to identify the periphery P1 of the towed vehicle V2. For example, the periphery P1 could be predefined or modelled based on stored geometric data defining the towed vehicle V2. As shown in FIG. 4A, a window W1 is defined within the identified periphery P1. The window W1 is rectangular in the present embodiment, but other shapes may be usefully employed.

The region of the towing vehicle image IMG1 enclosed by the periphery P1 represents the towed vehicle V2 within the towing vehicle image IMG1. As described herein, at least a portion of the towed vehicle image IMG2 is selectively inserted into a region of the towing vehicle image IMG1 disposed inside the identified periphery P1. The image processing module 6 generates third image data D3 in dependence on the first and second image data D1, D2 received from the towing vehicle camera C1 and the towed vehicle camera C2. The third image data D3 represents a composite image IMG3 which is output for display on the display screen 10. The first image data D1 and the second image data D2 are combined such that the towed vehicle image IMG2 is overlaid onto a corresponding region of the towing vehicle image IMG1. In the present embodiment, the selected region of the towed vehicle image IMG2 is inserted in the window W1 defined within the periphery P1. The towed vehicle image IMG2 may be rendered as a semi-transparent image such that the features of the towed vehicle V2 present in the towing vehicle image IMG1 remain visible. In the present embodiment the towed vehicle image IMG2 is rendered in the window W1 formed in the towing vehicle image IMG1, as shown in FIG. 4B. The resulting composite image IMG3 provides a substantially continuous, uninterrupted view of the region behind the towing vehicle V1.

As shown in FIG. 1, the towing vehicle camera C1 and the towed vehicle camera C2 are offset from each other in a longitudinal direction. The longitudinal offset results in the same object having different sizes in the towing vehicle image IMG1 and the towed vehicle image IMG2. This difference may be apparent in the composite image IMG3 generated by combining the towing vehicle image IMG1 and the towed vehicle image IMG2. The image processing module 6 in accordance with the present embodiment is configured to process the towing vehicle image IMG1 and/or the towed vehicle image IMG2 to reduce or remove any such discrepancies in the composite image IMG3. The operation of the image processing module 6 will now be described.

Figure 5A:
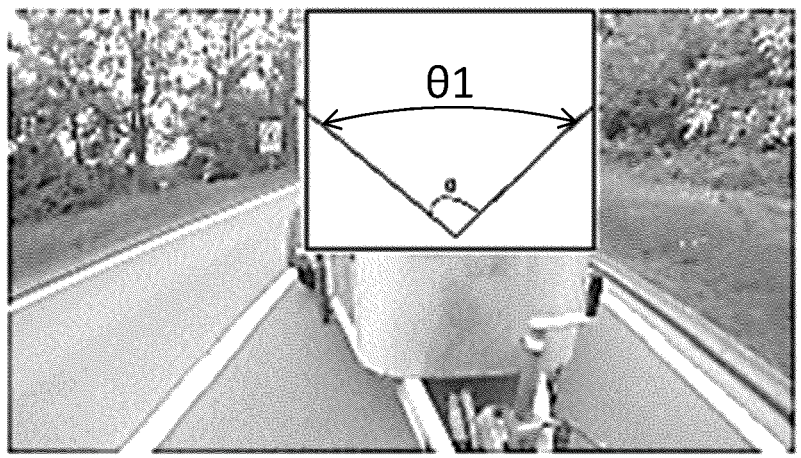
FIG. 5A illustrates determination of an angular extent of the window formed in the towing vehicle image.

The towing vehicle image IMG1 is received from the towing vehicle camera C1. As shown in FIG. 3A, the image processing module 6 analyses the towing vehicle image IMG1 to identify the periphery P1 of the towed vehicle V2. A window W1 is defined within the towing vehicle image IMG1 within the periphery P1, as shown in FIG. 4A. A first angular extent $\theta 1$ of the towed vehicle V2 within the towing vehicle image IMG1 is determined in a horizontal plane, as shown in FIG. 5A. The first angular extent $\theta 1$ represents the horizontal component of the towing vehicle image IMG1 occupied by the towed vehicle V2. The first angular extent $\theta 1$ may, for example, be determined with reference to predefined dimensions of the towed vehicle V2 and a virtual camera viewport. The virtual camera viewport defines a reference point (origin) and may be coincident with the towing vehicle camera C1 or may be have a known offset from the towing vehicle camera C1. The first angular extent $\theta 1$ is used as a template to identify a section of the towing vehicle image IMG1. Optionally, an angular extent of the towed vehicle V2 within the towing vehicle image IMG1 may be determined in a vertical plane. A horizontal position and/or a vertical position of the front face of the towed vehicle V2 in the towing vehicle image IMG1 is determined, for example using one or more of the following: a yaw (articulation) angle between the towing vehicle V1 and the towed vehicle V2; dimensions of the towed vehicle V2; and the periphery P1. A geometric centre of the towed vehicle V2 within the towing vehicle image IMG1 may be determined.

Figure 5B:
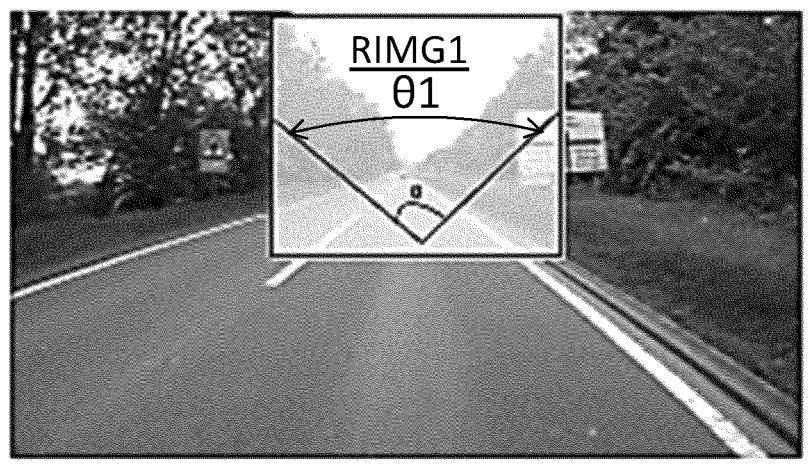
FIG. 5B illustrates selection of a subsection of the towed vehicle image in dependence on the determined angular extent of the window formed in the towing vehicle image.

As shown in FIG. 3B, the towed vehicle image IMG2 is received from the towed vehicle camera C2. The image processing module 6 identifies a first image sub-region RIMG1 of the towed vehicle image IMG2, as illustrated in FIG. 5B. The data corresponding to the first image sub-region RIMG1 is identified within the second image data D2. The size and position of the first image sub-region RIMG1 are defined in dependence on the determined size and position of the towed vehicle V2 within the towing vehicle image IMG1 (as defined by the periphery P1 derived from analysis of the towing vehicle image IMG1). A horizontal extent (along the X-axis) of the first image sub-region RIMG1 is proportional to the first angular extent $\theta 1$ determined through analysis of the towing vehicle image IMG1 in a horizontal plane. Optionally, a vertical extent (along the Y-axis) of the first image sub-region RIMG1 may be proportional to an angular extent in a vertical plane. When the towing vehicle V1 and the towed vehicle V2 are substantially aligned, the horizontal location of the first image sub-region RIMG1 within the towed vehicle image IMG2 at least substantially matches the determined horizontal location of the front face of the towed vehicle V2 in the towing vehicle image IMG1. The vertical location of the first image sub-region RIMG1 within the towed vehicle image IMG2 at least substantially matches the determined vertical location of the front face of the towed vehicle V2 in the towing vehicle image IMG1. A geometric centre of the first image sub-region RIMG1 may be at least substantially aligned with the determined geometric centre of the towed vehicle V2 within the towing vehicle image IMG1.

Figure 5C:
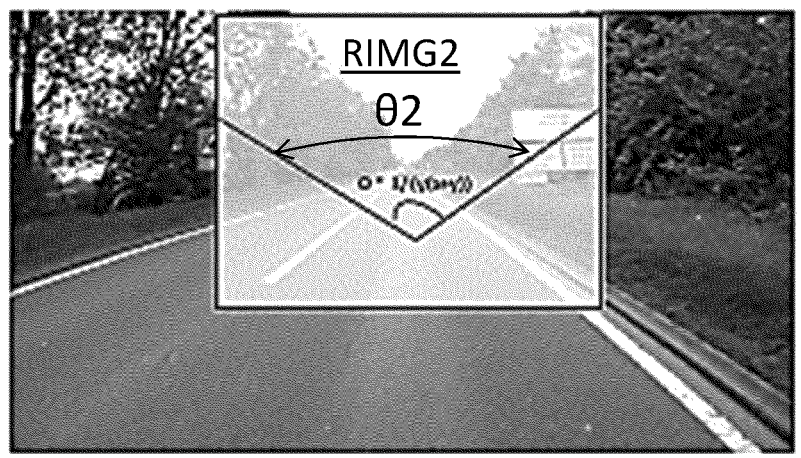
FIG. 5C illustrates a scaled angular extent of the subsection of the towed vehicle image.
Figure 5D:
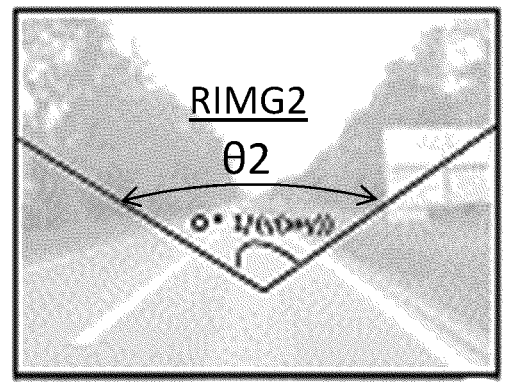
FIG. 5D illustrates selection of the scaled subsection of the towed vehicle image.
Figure 5E:
FIG. 5E illustrates a re-sizing of the subsection extracted from the towed vehicle image.

As shown in FIG. 5C, the first angular extent $\theta 1$ is multiplied by a first scaling factor SF1 to calculate a second (scaled) angular extent $\theta 2$ ($\theta 2 = \theta 1 \cdot SF1$). The first scaling factor SF1 is operative to modify the angular extent of the first image sub-region RIMG1 within the towed vehicle image IMG2. The first scaling factor SF1 is larger than one (1). As illustrated in FIG. 5E, the second angular extent $\theta 2$ is larger than the first angular extent $\theta 1$ such that the selected subsection of the original (raw) towed vehicle image IMG2 is larger than the region identified in the original (raw) towing vehicle image IMG1 as corresponding to the towed vehicle V2. The first scaling factor SF1 is applied to avoid a border (or gap) being formed in the composite image IMG3. The first scaling factor SF1 is defined as follows:

$$SF1 = \frac{(x+y)}{y} \quad [1]$$

Where
x is the first longitudinal distance; and
y is a reference distance.

The reference distance y is a distance between the towed vehicle camera C2 and a virtual object O1 (shown in FIG. 1). The reference distance y is calculated as follows:

$$y = t \cdot V_{ref} + c \quad [2]$$

Where
t is a reference time period;
Vref is the reference speed of the towing vehicle V1; and
c is a constant.

The reference time period t is used to calibrate the reference distance y between the towed vehicle camera C2 and the virtual object. The reference time period t in the present embodiment is predefined. It has been determined that a reference time period t of two (2) seconds (i.e. t=2 secs) is appropriate. The reference time period t may be less than or greater than two (2) seconds. The constant c may represent a longitudinal offset between the towing vehicle camera C1 and the towed vehicle camera C2. The constant c may, for example, be two (2) metres (i.e. c=2 m). The constant c may be less than or greater than two (2) metres. The reference speed Vref of the towing vehicle V1 may be determined in dependence on one or more wheel speed sensors. Other techniques, such as a satellite positioning system, may be used to determine the reference speed Vref.

As outlined above, the first scaling factor SF1 is greater than one (1). Consequently, the second angular extent θ2 is larger than the first angular extent θ1 (θ2>θ1). The second angular extent θ2 defines a second image sub-region RIMG2 within the towed vehicle image IMG2. As illustrated by FIGS. 5B and 3C, the second image sub-region RIMG2 is larger than the first image sub-region RIMG1. The subsection of the towed vehicle data D1 corresponding to the second image sub-region RIMG2 is extracted from the towed vehicle image IMG2, as illustrated in FIG. 5D. The towed vehicle image IM2 is thereby cropped to generate the second image sub-region RIMG2.

The second image sub-region RIMG2 is then scaled by a second scaling factor SF2. The second scaling factor SF2 is applied to re-size the second image sub-region RIMG2 (i.e. to modify the size of the second image sub-region RIMG2). The second scaling factor SF2 thereby changes the size of objects and features within the towed vehicle image IMG2. In the present embodiment, the second scaling factor SF1 is less than one (1). Accordingly, the second scaling factor SF2 is operative to reduce the size of the second image sub-region RIMG2, as illustrated in FIG. 5E. The second scaling factor SF2 is defined as follows:

$$SF2 = \frac{y}{(x+y)} \quad [3]$$

Where
x is the first longitudinal distance; and
y is the reference distance.

Figure 5F:
FIG. 5F illustrates a composite image formed by inserting the re-sized subsection of the towed vehicle image into the towing vehicle image.

The re-sized second image sub-region RIMG2 is then combined with the towing vehicle image IMG1 to generate the composite image IMG3. In particular, the re-sized second image sub-region RIMG2 is overlaid onto the towing vehicle image IMG1 in the region bounded by the periphery P1. The resulting composite image IMG3 is illustrated in FIG. 5F.

The first and second scaling factors SF1, SF2 are complementary. In the present embodiment, the second scaling factor SF2 is the inverse of the first scaling factor SF1. However, the relationship between the first and second scaling factors SF1, SF2 may be modified, for example to compensate for differences in the first and second angles of view α, β. A correction factor corresponding to the ratio of the first angle of view α to the second angle of view β (i.e. α/β) may be applied to the second scaling factor SF2.

The first and second scaling factors SF1, SF2 are dynamic and vary in dependence on the current operating parameters of the towing vehicle V1. In particular, the first and second scaling factors SF1, SF2 are determined in dependence on the reference speed Vref of the towing vehicle V1. Consequently, the size of an object displayed in the composite image IMG3 will vary depending on the reference speed Vref of the towing vehicle V1 even if the distance between the towed vehicle V2 and the object is substantially constant. The effect of implementing dynamic image scaling will now be described.

The towing vehicle image IMG1 is shown in FIG. 3A; and the towed vehicle image IMG2 is shown in FIG. 3B. A periphery P1 of at least a portion of the towed vehicle V2 is identified in the towing vehicle image IMG1. A cut-out or window is formed within the region of the towing vehicle image IMG1 bounded by the periphery P1, as shown in FIG. 4A. A region of the towed vehicle image IMG2 is inserted into the towing vehicle image IMG1 to form the composite image IMG3. The result of inserting the selected region of the towed vehicle image IMG2 directly into the towed vehicle image IMG1 without performing any scaling operations is illustrated in FIG. 4B. It will be appreciated that this technique results in inconsistencies in the composite image IMG3, for example the composite image IMG3 may comprise interruptions or discontinuities across the transition between the first and second images IMG1, IMG2. At least in certain embodiments of the present invention, these inconsistencies may be reduced or removed by performing dynamic scaling.

Figure 6:
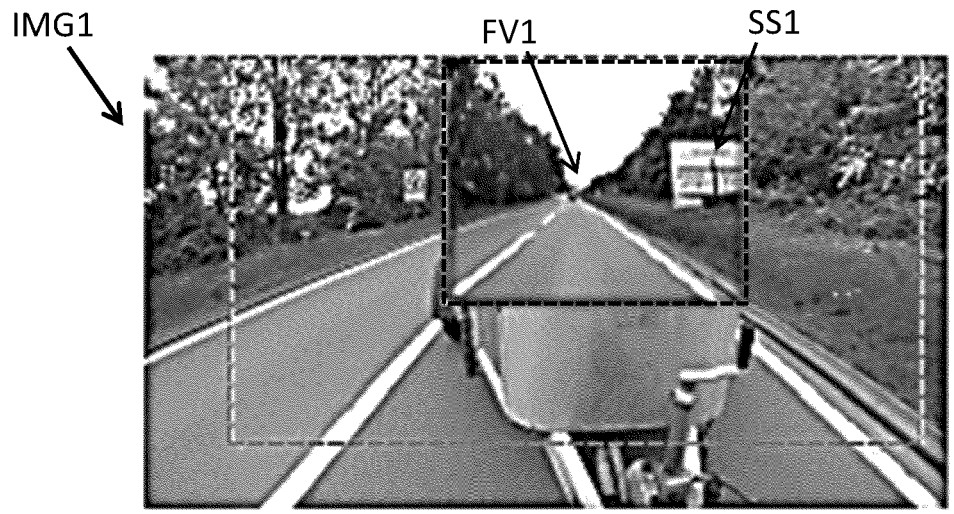
FIG. 6 illustrates a composite image generated when the towing vehicle and the towed vehicle are travelling at a first reference speed.
Figure 7:
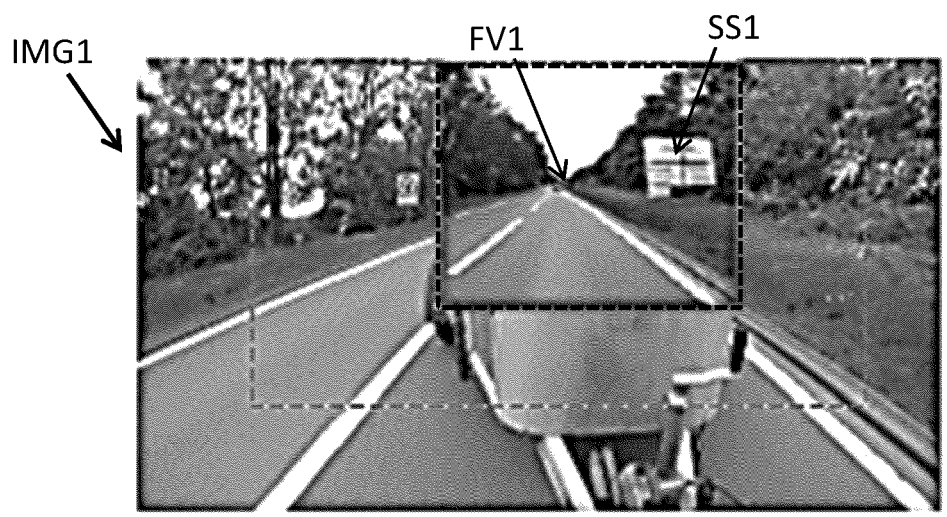
FIG. 7 illustrates a composite image generated when the towing vehicle and the towed vehicle are travelling at a second reference speed.
Figure 8:
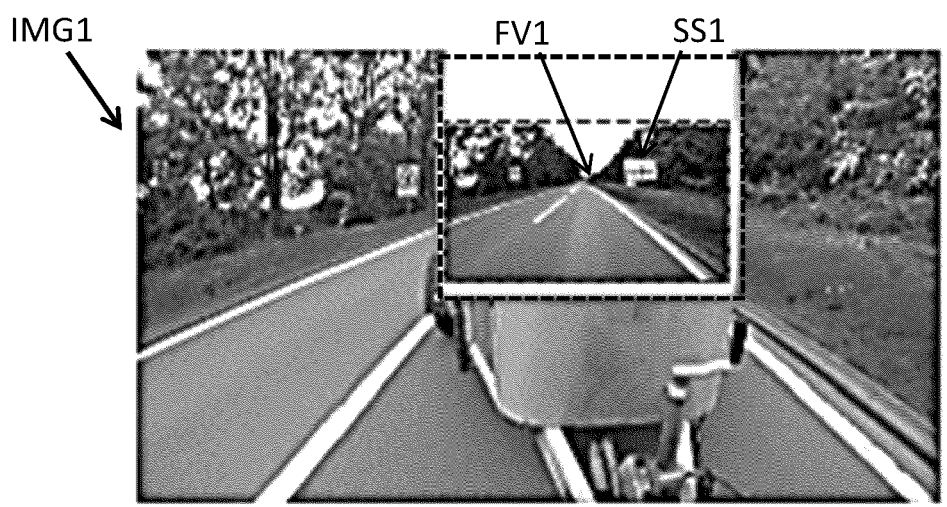
FIG. 8 illustrates a composite image generated when the towing vehicle and the towed vehicle are travelling at a third reference speed.

The operation of the imaging system 1 to implement dynamic scaling is illustrated in FIGS. 6, 7 and 8. The image shown in FIG. 6 represents a scenario in which the towing vehicle V1 and the towed vehicle V2 are travelling at a first reference speed Vref1. The image shown in FIG. 7 represents a scenario in which the towing vehicle V1 and the towed vehicle V2 are travelling at a second reference speed Vref2. The image shown in FIG. 8 represents a scenario in which the towing vehicle V1 and the towed vehicle V2 are travelling at a third reference speed Vref3. The first reference speed Vref1 is greater than the second reference speed Vref2 which is greater than the third reference speed Vref3 (i.e. Vref1>Vref2>Vref3).

The reference distance y is proportional to the reference velocity Vref. Thus, the reference distance y increases as the reference velocity Vref increases. The reference distance y is larger when the towing vehicle V1 is travelling at the first reference speed Vref1 than when travelling at either the second reference speed Vref2 or the third reference speed Vref3. Similarly, the reference distance y is larger when the towing vehicle V1 is travelling at the second reference speed Vref2 than when travelling at the third reference speed Vref3.

The second scaling factor SF2 is dynamic and varies in dependence on the reference speed Vref. In the present embodiment, the second scaling factor SF2 is less than one (1) such that the size of the towed vehicle image IMG2 is reduced. In alternate embodiments, the second scaling factor SF2 may be greater than one (1) such that the size of the towed vehicle image IMG2 is increased. The second scaling factor SF2 may, for example be modified to compensate for different first and second angles of view α, β. The second scaling factor SF2 is proportional to the reference speed Vref. Thus, the second scaling factor SF2 is larger at high reference speeds Vref than at low reference speeds Vref. In the illustrated example, the second scaling factor SF2 is larger when the towing vehicle V1 is travelling at the first reference speed Vref1 than when travelling at either the second reference speed Vref2 or the third reference speed Vref3. Similarly, the second scaling factor SF2 is larger when the towing vehicle V1 is travelling at the second reference speed Vref2 than when travelling at the third reference speed Vref2. In the illustrated example, when the towing vehicle V1 is travelling at the first reference speed Vref1, the second scaling factor SF2 is approximately 0.9 such that the towed vehicle image IMG2 is scaled by approximately 90%. When the towing vehicle V1 is travelling at the second reference speed Vref2, the second scaling factor SF2 is approximately 0.7 such that the towed vehicle image IMG2 is scaled by approximately 70%. When the towing vehicle V1 is travelling at the third reference speed Vref3, the second scaling factor SF2 is approximately 0.25 such that the towed vehicle image IMG2 is scaled by approximately 25%. The variations in the size of the following vehicle FV1 and the street sign SS1 in the composite image IMG3 as a result of the application of the second scaling function SF2 to the towed vehicle image IMG1 are apparent in FIGS. 6, 7 and 8. As outlined above, the first scaling factor SF1 is applied to the first angular extent θ1 to adjust the angular extent of the second image sub-region RIMG2 extracted from the towed vehicle image IMG2 in order to reduce or avoid formation of a border or gap around the towed vehicle image IMG2 in the composite image IMG3.

Figure 9:
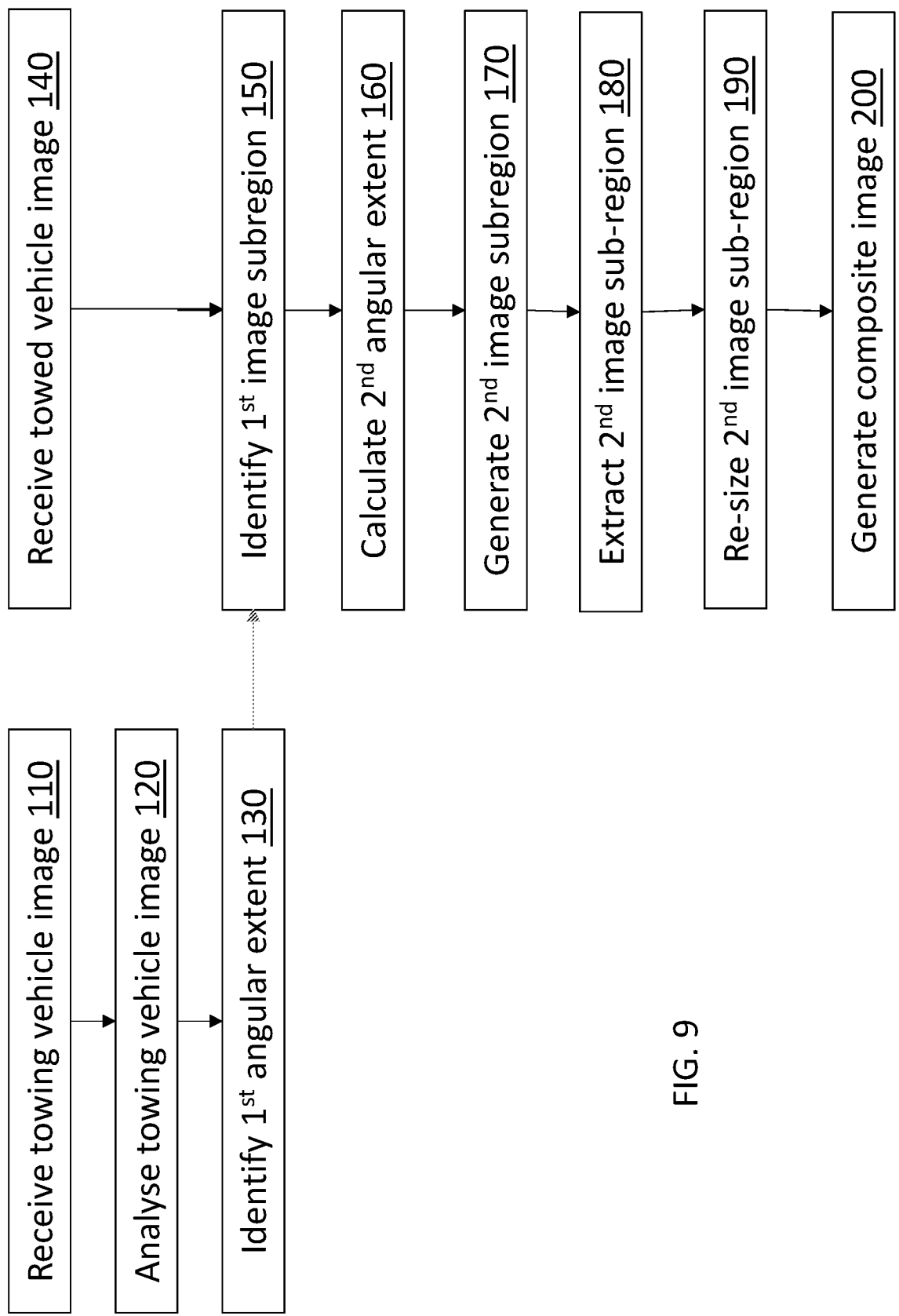
FIG. 9 shows a block diagram representing implementation of the imaging system according to the present embodiment.

A block diagram 100 illustrating operation of the imaging system 1 is shown in FIG. 9. The towing vehicle image IMG1 is received from the towing vehicle camera C1 (BLOCK 110). The towing vehicle image IMG1 is analysed to identify a region representing a front face or a frontal region of the towed vehicle V2 (BLOCK 120). A first angular extent θ1 of the front face of the towed vehicle V2 within the towing vehicle image IMG1 is identified (BLOCK 130). The towed vehicle image IMG2 is received from the towed vehicle camera C2 (BLOCK 140). A first image sub-region RIMG1 is identified in the towed vehicle image IMG2 (BLOCK 150), the size and position of the first image sub-region RIMG1 corresponds to those of the region representing a front face or a frontal region of the towed vehicle V2. The horizontal and/or vertical position of the first image sub-region RIMG1 may optionally be modified, for example to compensate for changes in the articulation angle between the towing vehicle V1 and the towed vehicle V2. The first angular extent θ1 is multiplied by a first scaling factor SF1 to calculate a second angular extent θ2 (BLOCK 160). The angular extent of the first image sub-region RIMG1 is modified in dependence on the second angular extent θ2 to generate a second image sub-region RIMG2 (BLOCK 170). The resulting second image sub-region RIMG2 is extracted from the towing vehicle image IMG2 (BLOCK 180). A second scaling factor SF2 is applied to re-size the second image sub-region RIMG2 (BLOCK 190). The re-sized second image sub-region RIMG2 is then combined with the towing vehicle image IMG1 to generate the composite image IMG3 (BLOCK 200). The composite image IMG3 may be output to a display screen 10 or other vehicle system.

The imaging system 1 in the above embodiment has been described as generating a composite image IMG3. It has been recognised that aspects of the imaging system 1 described in the above embodiment may be employed to provide a more intuitive human machine interface. A variant of the imaging system 1 will now be described with reference to FIG. 10. Like reference numerals are used for like components. The techniques described in relation to the variant may be used in combination with the techniques contemplated herein, or independently of the other techniques.

Figure 10:
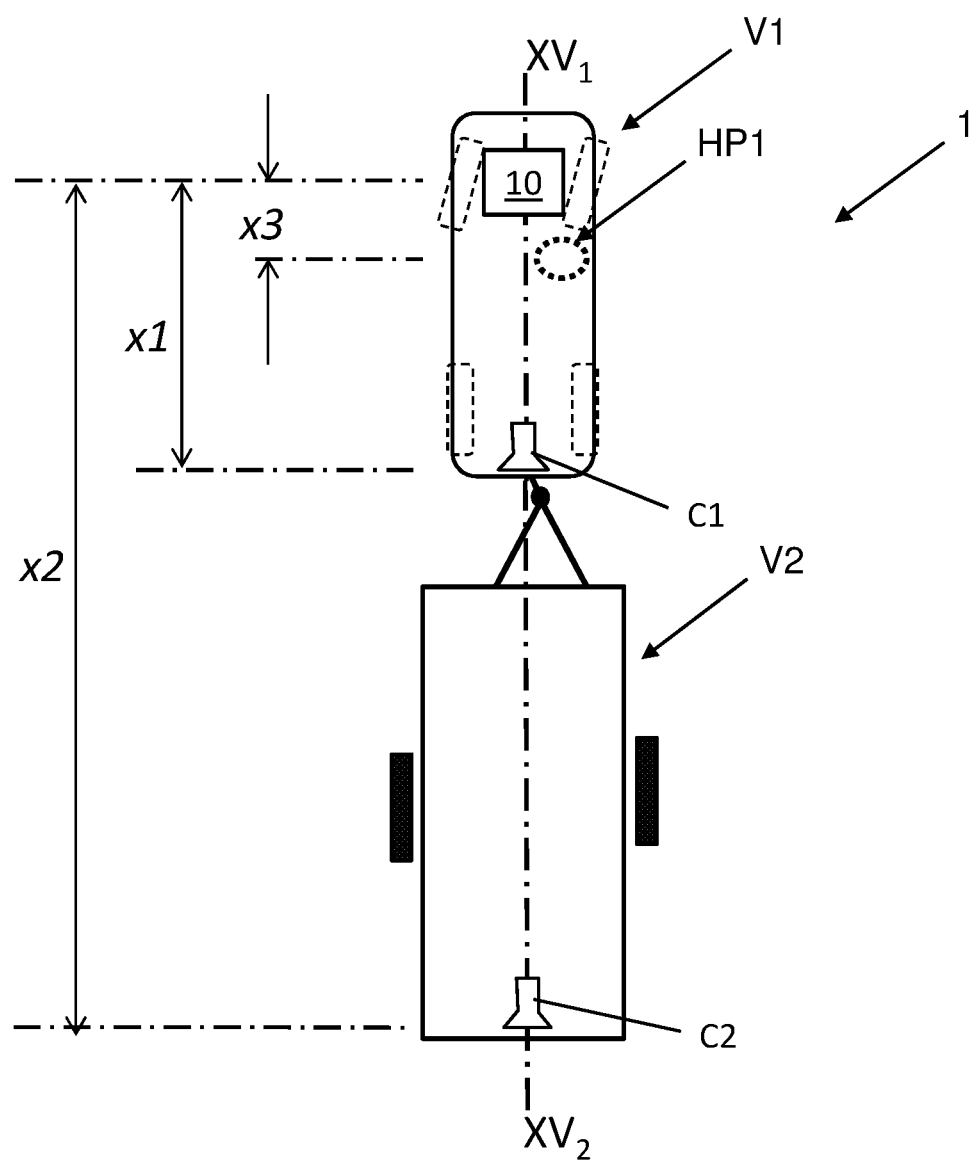
FIG. 10 shows a schematic representation of an imaging system according to a further embodiment of the present invention provided in a towing vehicle and a towed vehicle.

The imaging system 1 is configured to output an image to a display screen 10 provided in the towing vehicle V1. The display screen 10 is typically configured for viewing by a driver (not shown) of the towing vehicle V1. The display screen 10 may, for example, be provided in a dashboard or a centre control of the towing vehicle V1. The image may, for example, be captured by a towing vehicle camera C1 or the towed vehicle camera C2. As described above, the towing vehicle camera C1 is a rear-facing camera disposed at the rear of the towing vehicle V1; and the towed vehicle camera C2 is a rear-facing camera disposed at the rear of the towed vehicle V2. A camera offset distance is inherent between the display screen 10 and the source camera (either the towing vehicle camera C1 or the towed vehicle camera C2 in the present embodiment). As shown in FIG. 10, there is a first camera offset distance x1 between the display screen 10 and the towing vehicle camera C1; and a second camera offset distance x2 between the display screen 10 and the towed vehicle camera C2. As a result of the camera offset distance x1, x2, an object present in the towing vehicle image IMG1 or the towed vehicle image IMG2 may appear larger when displayed on the display screen 10 than would be expected by the driver of the towing vehicle V1. For example, an object located proximal to the towing vehicle camera C1 would have a relatively large appearance when displayed on the display screen 10. In practice, however, the object is spaced apart from the driver by at least the first camera C1) offset distance. The same scene viewed directly by the driver (for example through the rear windshield) or in a rear-view mirror would have different scaling characteristics and the same object would be a different size. It has been recognised that the inherent differences in the display characteristics of the display screen 10 may be unintuitive to the driver.

To compensate for the above differences, the imaging system 1 is configured to apply a scaling factor to the source (raw) image data in dependence on the camera offset distance between the display screen 10 and the towing vehicle camera C1 or the towed vehicle camera C2. The scaling factor reduces the size of the image output to the display screen 10 in direct proportion to the camera offset distance x1, x2 measured in a longitudinal direction between the display screen 10 and the source camera (either the towing vehicle camera C1 or the towed vehicle camera C2 in the present embodiment). It will be understood that this technique may be applied to other cameras disposed on the towing vehicle V1 or the towed vehicle V2. A plurality of scaling factors may be defined, each scaling factor being associated with one of a plurality of cameras. For example, a first scaling factor may be defined for the towing vehicle camera C1; and a second scaling factor may be defined for the towed vehicle camera C2. Alternatively, the scaling factor may be calculated dynamically, for example in dependence on positional information provided by the user or onboard systems. The first scaling factor may be determined in dependence on the towing vehicle camera offset distance;

and the second scaling factor may be determined in dependence on the towed vehicle camera offset distance. The imaging system 1 may select one of the plurality of scaling factors in dependence on a selected one of a plurality of the cameras.

The imaging system 1 may optionally also take account of a reference head offset distance x3 between the display screen 10 and a reference head position HP1 of a driver of the towing vehicle V2. The reference head position HP1 is an estimated or approximated position of the drivers head when driving the vehicle. The reference head position HP1 may be predefined or may be variable, for example in dependence on a position of the driver's seat. Although the reference head offset distance x3 is typically smaller than the camera offset distance, the inclusion of the reference head offset distance may render the display image more intuitive to the driver.

It will be understood that this embodiment may be implemented with or without a towed vehicle V2. For example, the imaging system 1 may be configured to provide scaling of images captured from one or more cameras provided on a vehicle and displayed on a display screen in the same vehicle.

Example controllers 2 have been described comprising at least one electronic processor 3 configured to execute electronic instructions stored within at least one memory device 4, which when executed causes the electronic processor(s) 3 to carry out the method as herein described. However, it is contemplated that the present invention is not limited to being implemented by way of programmable processing devices, and that at least some of, and in some embodiments all of, the functionality and or method steps of the present invention may equally be implemented by way of non-programmable hardware, such as by way of non-programmable ASIC, Boolean logic circuitry, etc.

The imaging devices C1, C2 described herein comprise digital cameras. The cameras may be optical cameras, for example operating in the visible or non-visible light spectrum. Alternatively, or in addition, the imaging devices C1, C2 may comprise other types of sensors. For example, the imaging devices C1, C2 may comprise one or more of the following: an ultrasonic sensor, a LIDAR sensor and a RADAR sensor.

It will be appreciated that various changes and modifications can be made to the present invention without departing from the scope of the present application.

Aspects of the inventions are outlined in the following numbered clauses:

1. An imaging system for a towing vehicle, the imaging system having a processor configured to:
   determine a reference speed of the towing vehicle;
   receive first image data from a first imaging device disposed on the towing vehicle;
   receive second image data from a second imaging device disposed on a towed vehicle;
   apply a first scaling factor to the second image data to generate scaled second image data, the first scaling factor being determined in dependence on the determined reference speed of the towing vehicle;
   generate composite image data by combining at least a part of the scaled second image data with at least a part of the first image data; and
   output the composite image data for display on a display screen.

2. An imaging system according to clause 1 comprising selecting a subsection of the second image data and applying the first scaling factor to the selected subsection of the second image data.

3. An imaging system according to clause 1 comprising selecting a subsection of the scaled second image data; and generating the composite image data by combining the selected subsection of the scaled second image data and the first image data.

4. An imaging system according to any one of clauses 1, 2 or 3, wherein generating the composite image data comprises inserting the scaled second image data into a window formed in the first image data.

5. An imaging system according to any one of the preceding clauses, wherein the first imaging device has a first angle of view and the second imaging device has a second angle of view; wherein the first scaling factor is determined in dependence on a ratio of the first and second angles of view.

6. An imaging system according to any one of the preceding clauses, wherein the first scaling factor is inversely proportional to a first longitudinal distance between the first imaging device and the second imaging device.

7. An imaging system according to clause 6, wherein the first scaling factor is calculated according to the following formula:

$$\text{Scaling Factor} = \frac{y}{(x+y)}$$

Where
   x is the first longitudinal distance between the first imaging device and the second imaging device; and
   y is a reference distance between the first imaging device and a virtual object.

8. An imaging system according to clause 7, wherein the reference distance is calculated according to the following formula:

$$y = t \cdot V\text{ref} + c$$

Where
   t is a reference time period;
   Vref is the reference speed of the towing vehicle; and
   c is a constant.

9. An imaging system according to any one of the preceding clauses, wherein the processor is configured to apply a second scaling factor to at least one of the first image data and the second image data, the second scaling factor being determined in dependence on a first imaging device offset distance measured between the first imaging device and the display screen.

10. An imaging system according to clause 9, wherein the second scaling factor is determined in dependence on a sum of the first imaging device offset distance and a reference head offset distance, the reference head offset distance being the distance between the display screen and a reference head position.

11. A vehicle comprising an imaging system according to any one of the preceding clauses.

12. A method of generating a composite image, the method comprising:
   determining a reference speed of a host vehicle;
   receiving a first image from a first imaging device;
   receiving a second image from a second imaging device;

apply a first scaling factor to the second image to generate a scaled second image, the first scaling factor being determined in dependence on the determined reference speed of the host vehicle;

generating the composite image by combining at least a part of the scaled second image and at least a part of the first image data; and outputting the composite image for display on a display screen.

13. A method according to clause 12 comprising selecting a subsection of the second image and applying the first scaling factor to the selected subsection of the second image.

14. A method according to clause 12 comprising selecting a subsection of the scaled second image; and generating the composite image by combining the selected subsection of the scaled second image and the first image.

15. A method according to any one of clauses 12, 13 or 14, wherein generating the composite image comprises inserting the scaled second image into a window in the first image.

16. A method according to any one of clauses 12 to 15, wherein the first imaging device has a first angle of view and the second imaging device has a second angle of view; and the first scaling factor is determined in dependence on a ratio of the first and second angles of view.

17. A method according to any one of clauses 12 to 16, wherein the first scaling factor is inversely proportional to a first longitudinal distance between the first imaging device and the second imaging device.

18. A method according to clause 17, wherein the first scaling factor is calculated according to the following formula:

$$\text{Scaling Factor} = \frac{y}{(x+y)}$$

Where
x is the first longitudinal distance between the first imaging device and the second imaging device; and
y is a reference distance between the first imaging device and a virtual object.

19. A method according to clause 18, wherein the reference distance is calculated according to the following formula:

$$y = t \cdot V\text{ref} + c$$

Where
t is a reference time period;
Vref is the reference speed of the towing vehicle; and
c is a constant.

20. A method according to any one of the clauses 12 to 19 comprising applying a second scaling factor to at least one of the first image and the second image, the second scaling factor being determined in dependence on a first imaging device offset distance measured between the first imaging device and the display screen.

21. A method according to clause 20, wherein the second scaling factor is determined in dependence on a sum of the first imaging device offset distance and a reference head offset distance, the reference head offset distance being the distance between the display screen and a reference head position.

22. A non-transitory computer-readable medium having a set of instructions stored therein which, when executed, cause a processor to perform the method claimed in any one of clauses 12 to 21.

The invention claimed is:

1. An imaging system for a towing vehicle, the imaging system comprising
a processor configured to:
determine a reference speed of the towing vehicle;
receive first image data from a first imaging device disposed on the towing vehicle;
receive second image data from a second imaging device disposed on a towed vehicle;
apply a first scaling factor to the second image data to generate scaled second image data, the first scaling factor being determined in dependence on the determined reference speed of the towing vehicle;
generate composite image data by combining at least a part of the scaled second image data with at least a part of the first image data; and
output the composite image data for display on a display screen.

2. An imaging system according to claim 1 comprising selecting a subsection of the second image data and applying the first scaling factor to the selected subsection of the second image data.

3. An imaging system according to claim 1 comprising selecting a subsection of the scaled second image data; and generating the composite image data by combining the selected subsection of the scaled second image data and the first image data.

4. An imaging system according to claim 1, wherein the processor is configured to generate the composite image data by inserting the scaled second image data into a window formed in the first image data.

5. An imaging system according to claim 1, wherein the first imaging device has a first angle of view and the second imaging device has a second angle of view; and wherein the first scaling factor is determined in dependence on a ratio of the first and second angles of view.

6. An imaging system according to claim 1, wherein the first scaling factor is inversely proportional to a first longitudinal distance between the first imaging device and the second imaging device.

7. An imaging system according to claim 6, wherein the first scaling factor is calculated according to the following formula:

$$\text{Scaling Factor} = \frac{y}{(x+y)}$$

where is the first longitudinal distance between the first imaging device and the second imaging device; and
y is a reference distance calculated according to the following formula:

$$y = t \cdot V\text{ref} + c$$

where t is a reference time period;
Vref is the reference speed of the towing vehicle; and
c is a constant that represents a longitudinal offset between the first imaging device and the second imaging device.

8. An imaging system according to claim 1, wherein the processor is configured to apply a second scaling factor to at least one of the first image data and the second image data, the second scaling factor being determined in dependence on a first imaging device offset distance measured between the first imaging device and the display screen.

9. An imaging system according to claim 8, wherein the second scaling factor is determined in dependence on a sum of the first imaging device offset distance and a reference head offset distance, the reference head offset distance being the distance between the display screen and a reference head position.

10. An imaging system according to claim 1, wherein the processor is configured to apply the first scaling factor to the second image to alter a size of at least one object appearing in the second image.

11. An imaging system according to claim 1, wherein
at least one object appears in the first image and the second image;
the at least one object appears to have a first size in the first image that differs from a second size of the at least one object appears to have in the second image; and
the processor is configured to apply the first scaling factor to the second image to alter the second size of at least one object to be the same as the first size.

12. A method of generating a composite image, the method comprising:
determining a reference speed of a host vehicle;
receiving a first image from a first imaging device;
receiving a second image from a second imaging device;
applying a first scaling factor to the second image to generate a scaled second image, the first scaling factor being determined in dependence on the determined reference speed of the host vehicle;
generating the composite image by combining at least a part of the scaled second image and at least a part of the first image data; and
outputting the composite image for display on a display screen.

13. A non-transitory computer-readable medium having a set of instructions stored therein which, when executed, cause a processor to perform the method claimed in claim 12.

14. The method according to claim 12, wherein applying the first scaling factor to the second image alters a size of at least one object appearing in the second image.

15. The method according to claim 12, wherein
at least one object appears in the first image and the second image;
the at least one object appears to have a first size in the first image that differs from a second size of the at least one object appears to have in the second image; and
applying the first scaling factor to the second image alters the second size of at least one object to be the same as the first size.

16. A vehicle comprising an imaging system, the imaging system comprising a processor configured to:
determine a reference speed of the vehicle;
receive first image data from a first imaging device disposed on the vehicle;
receive second image data from a second imaging device disposed on a towed vehicle behind the vehicle;
apply a first scaling factor to the second image data to generate scaled second image data, the first scaling factor being determined in dependence on the determined reference speed of the vehicle; and
generate composite image data for display by combining at least a part of the scaled second image data with at least a part of the first image data.

\* \* \* \* \*